United States Patent
Bogie

[11] 3,754,603
[45] Aug. 28, 1973

[54] LAND CLEARING MACHINE

[76] Inventor: Nelson H. Bogie, Rt. 1, Sledd Creek Rd., Gilbertsville, Ky.

[22] Filed: Oct. 12, 1971

[21] Appl. No.: 188,120

[52] U.S. Cl. ............... 172/45, 172/123, 172/125, 56/294
[51] Int. Cl. ..................... A01b 33/02, A01d 55/18
[58] Field of Search .................. 172/27, 28, 35, 45, 172/122–123, 125, 96; 56/10.9, 11.9, 294; 299/39, 89; 37/8

[56] References Cited
UNITED STATES PATENTS

| | | | |
|---|---|---|---|
| 2,691,262 | 10/1954 | Swertfeger | 172/45 |
| 1,782,636 | 11/1930 | Stokes | 56/294 |
| 3,051,459 | 8/1962 | Witzenburg | 299/89 |
| 3,271,939 | 9/1966 | Granger et al. | 56/294 |
| 2,109,393 | 2/1938 | Bleu | 172/125 |
| 1,862,035 | 6/1932 | Rainwater | 172/45 |
| 3,210,123 | 10/1965 | Delli-Gatti | 299/89 |
| 3,557,473 | 1/1971 | Grossklaus et al. | 37/8 |
| 3,584,406 | 6/1971 | Kershaw | 172/123 |
| 3,020,694 | 2/1962 | Foshee et al. | 172/45 |

*Primary Examiner*—Robert E. Pulfrey
*Assistant Examiner*—Paul T. Sewell
*Attorney*—Harrington A. Lackey

[57] ABSTRACT

A mobile frame, preferably self-propelled, supporting for adjustable vertical pivotal movement a transverse rotary drum carrying a plurality of circumferentially and axially spaced flails. The drum is driven internally by a fluid motor supplied with a source of fluid power from the mobile frame.

6 Claims, 5 Drawing Figures

Patented Aug. 28, 1973
3,754,603
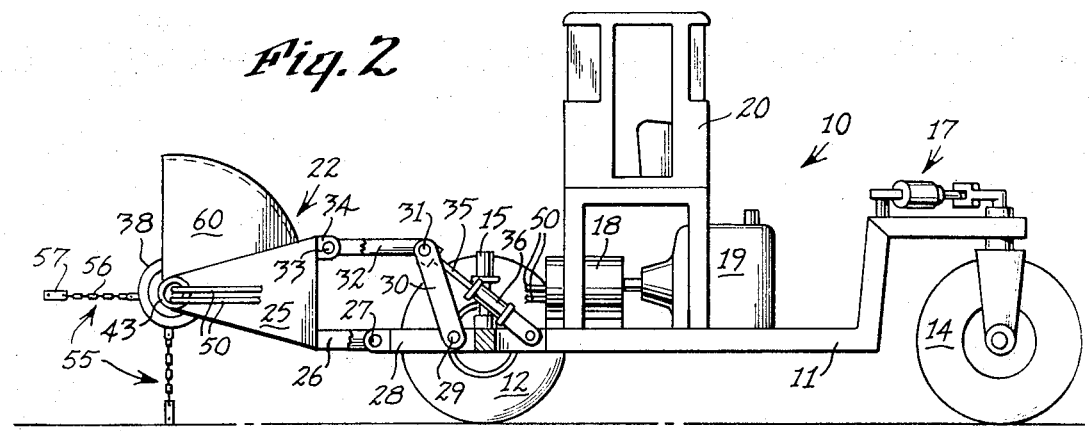
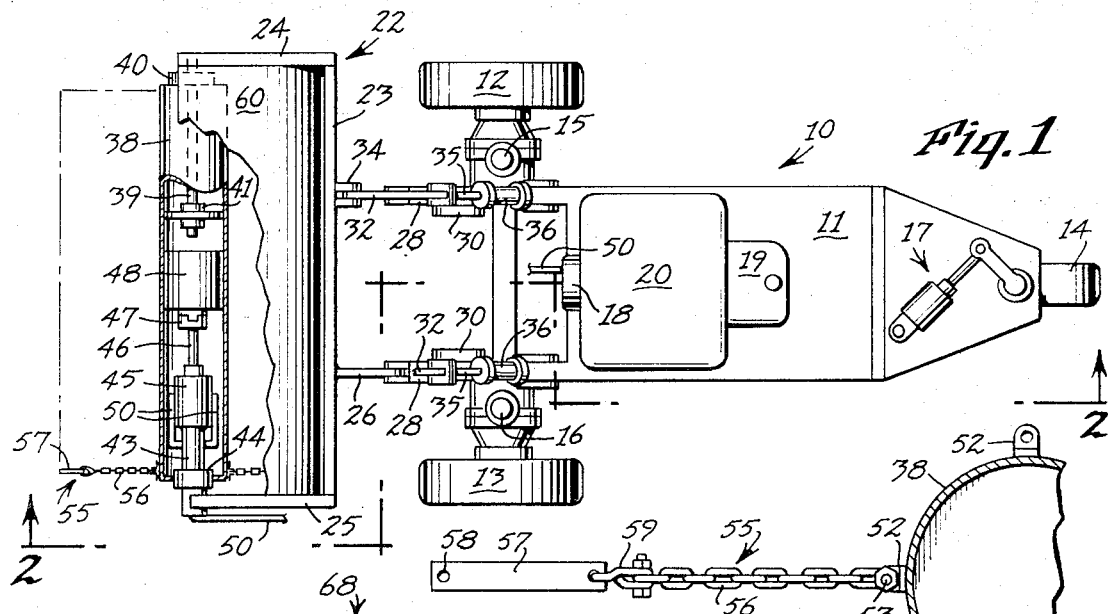
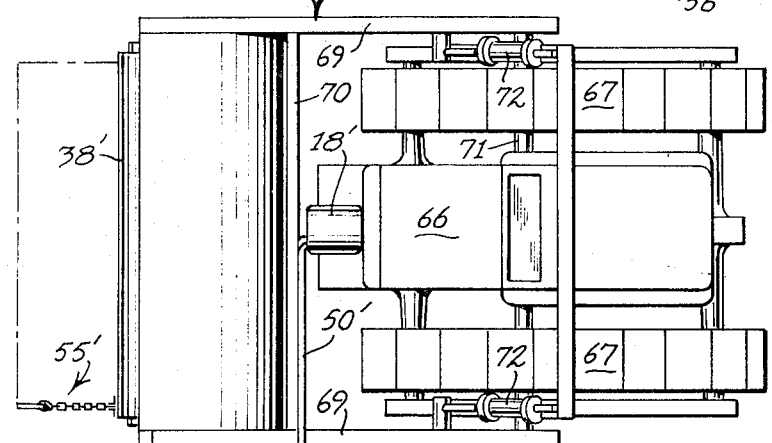
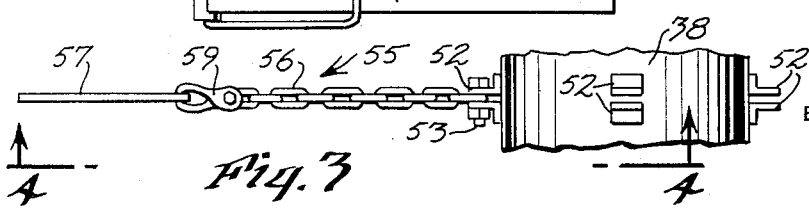
INVENTOR:
NELSON H. BOGIE
BY Harrington A. Lackey
ATTORNEY

LAND CLEARING MACHINE

BACKGROUND OF THE INVENTION

This invention relates to a land clearing machine, and more particularly to a mobile land clearing machine having rotary flails.

Land clearing machines having rotary flails are known in the art. One such type of rotary flail machine is disclosed in U. S. Pat. No. 2,691,262, issued to Swertfeger on Oct. 12, 1954. Swertfeger's machine includes a self-propelled traction vehicle, upon which is mounted a frame for pivotal movement about a central transverse axis. On the front of the frame is a rotary drum supporting a plurality of chain-type flails, driven through a belt-and-pulley transmission from an auxiliary transmission engine mounted on the rear of the frame. Front wheels are mounted externally on the frame and provided with fluid cylinders for vertically adjusting the frame relative to the wheels in order to adjust the operating level of the flails. The frame may also be raised or lowered by another hydraulic cylinder mounted on the vehicle.

Because of the external transmission and drive of the rotary drum, special deflector shields must be mounted on the rotary drum shaft in order to protect the pulley and other transmission parts from the rapidly revolving flails. Moreover, because of the heavy drive and transmission elements employed, the motor is mounted on the rear of the frame in order to counter-balance the weight of the drum about the transverse pivotal axis.

SUMMARY OF THE INVENTION

It is therefore an object of this invention to provide a rotary-flail-type land clearing machine, which is not only self-propelled, but provides a light-weight drive and transmission mechanism which does not require counterbalancing weights or unnecessary extension of the transmission elements in order to balance the loads.

Another object of this invention is to provide a hollow, rotary, flail-supporting drum having sufficient interior space to receive a small, fluid drive mechanism. Such an arrangement provides complete protection for the drive mechanism, including a fluid motor and transmission parts, from damage by the flails, and flying debris. Furthermore, the vertically adjustable frame for supporting the rotary drum, flails and fluid motor may be located entirely in front of the mobile frame.

The yoke frame supporting the drum and flails is long enough to span the overall width of the mobile frame, so that the flails will clear a path through which the entire mobile frame and traction members may move, unimpeded.

Another object of this invention is to provide a land clearing machine employing a single hydraulic system for supplying all the power for propelling and guiding the mobile frame, driving the rotary flail drum, and also for vertically adjusting the drum.

BRIEF DESCRIPTION OF THE DRAWINGS

FIG. 1 is a plan view of one form of land clearing machine, with portions broken away to better disclose the invention;

FIG. 2 is a section taken along the line 2—2 of FIG. 1;

FIG. 3 is an enlarged fragmentary plan view of the rotary drum and one of its flails;

FIG. 4 is a section taken along the line 4-4 of FIG. 3; and

FIG. 5 is a plan view of the land clearing machine disclosed in FIG. 1, with a modified mobile frame and yoke frame.

DESCRIPTION OF THE PREFERRED EMBODIMENT

Referring now to the drawings in more detail, FIG. 1 and 2 disclose a land clearing machine 10 having a mobile frame 11 supported for movement along the ground by front wheels 12 and 13 and a steerable rear wheel 14. Each front wheel 12 and 13 is independently driven by a hydraulic motor 15 and 16, respectively, while rear wheel 14 is steered by a hydraulic steering mechanism 17. The hydraulic power for the motors 15 and 16 and steering mechanism 17 is supplied with hydraulic fluid through lines, not shown, from a hydraulic pump 18 driven by diesel engine 19 mounted on the mobile frame 11. The controls for operating the motors 15 and 16, steering mechanism 17 and all the other apparatus to be later described, are mounted within the control cabin 20.

Mounted on the front end of the mobile frame 11 is a yoke frame 22 having an elongated back member 23 and a pair of forwardly projecting end members 24 and 25.

Fixed to and projecting rearward of the back member 23 are a pair of lower arms 26, the rear ends of which are journaled by hinge pins 27 to corresponding tongues 28 projecting forward from the front end of the frame 11.

Pivotally mounted by the hinge pins 29 to the tongues 28 are a pair of upwardly directed link arms 30. The upper ends of the link arms 30 are pivotally connected by pins 31 to link bars 32, the forward ends of which are journaled by hinge pins 33 to journal ears 34 fixed to the back member 23 of the yoke frame 22, spaced above the lower arms 26. As disclosed in FIG. 2, each link arm 30 and corresponding link bar 32 form a knee joint at the hinge pin 31. Each hinge pin 31 is also connected to a piston rod 35 reciprocably driven by a hydraulic cylinder 36.

Journaled for rotary movement between the front ends of the end members 24 and 25 is a hollow rotary flail drum 38. Projecting axially into the drum from the end member 24 is a fixed journal shaft 39. The shaft 39 is journaled within bearings 40 and 41 forming a part of the drum 38.

Fixed to the end member 25 is a hollow shaft 43 about which the opposite, or left, end of the drum 38 is journaled by bearing 44 fixed in the end of the drum 38. Fixed to the inner end of the hollow shaft 43 is a fluid motor, such as hydraulic motor 45. The drive shaft 46 of hydraulic motor 45 is connected by coupling 47 to a driven member 48 in the form of a disc fixed coaxially within the drum 38. The driven disc member 48 is secured by bonding or fastening its periphery to the inner surface of the drum 38, preferably uniformly, so that the torque produced by the hydraulic motor 45 will be evenly distributed and transmitted to the drum surface 38.

Hydraulic fluid is supplied to the hydraulic motor 45 through fluid conduits or lines 50 from pump 18 on the mobile frame 11.

Fixed to the outer surface of the hollow rotary drum 38 by ears 52 and connecting bolts 53 are a plurality of flexible flails 55, disclosed in the drawings as including a chain 56 and a flail head or bar 57. Each flail bar 57 is preferably flat and rectangular and has a hole 58 at each end. By periodically removing the flail connector 59, the flail bar 57 may be reversed end for end, as well as being rotated 180° about its longitudinal axis, that is rotated side for side, in order to obtain the maximum utility from each flail bar 57. Rotating each flail bar 57 end for end or edge for edge, the flail bar 57 may be used three or four times longer than if it remained in the same position.

The flails 55 may be arranged circumferentially as well as axially of the drum 38 in any desired pattern. As disclosed in the drawings, four flails 55 are arranged at 90° intervals in cross-sectional planes spaced axially at preferably uniform intervals, along the drum 38.

The yoke frame 22 is preferably provided with an arcuate hood 60 in order to protect the operator, control cabin 20 and all other parts of the mobile frame 11 from flying debris, and also from any flails 55 which might accidentally become detached from the drum 38.

The land clearing machine 65, disclosed in FIG. 5, employs a mobile frame 66 supported on crawler traction elements 67. The yoke frame 68 has rearward projecting arms 69 behind the back member 70, which are journaled about trunnions 71 and supported by hydraulic cylinders 72 for raising and lowering. The yoke frame 68 supports for rotary movement a flail drum 38' identical to the flail drum 38 in the machine 10 and supporting flails 55 for breaking and decimating debris in advance of the moving machine 65. The rotary drum 38' is driven by the same internal elements included in the rotary drum 38. The internal hydraulic motor, not shown, identical to the hydraulic motor 45 is supplied with fluid through the lines 50' from hydraulic pump 18' mounted on the front of the mobile frame 66.

In the operation of the machine 10, the hydraulic cylinders 36 are powered to raise or lower the yoke frame 22 to its desired operating elevation. The wheel motors 15 and 16 are powered to drive the wheels 12 and 13 forward, and hydraulic fluid is supplied to the hydraulic motor 45 in order to drive the rotary drum 38 in either desired direction. The flails 55 rotate about the axis of rotary drum 38 at great speeds to beat, break, level and decimate brush, weeds and debris into smaller particles, or to knock them flat upon the ground in order to level the surface of the terrain over which the mobile frame 11 travels. By having the yoke frame 22 extend transversely in front of the front wheels 12 and 13, the wheels 12 and 13 will be protected against unnecessary encounters with brush and debris not otherwise encountered by the high speed flails 55. The yoke frame 68 and flail drum 38' of the machine 65 operate in the same manner as their counterparts in machine 10.

FIGS. 1 and 2 illustrate the small number of elements employed and the small amount of space utilized by the yoke frame 22, its adjustable mounting means 26-36, as well as the drive and transmission elements 45-48 for the rotary drum 38. All of these parts can be small and relatively lightweight and yet possess the optimum amount of strength for carrying out their rugged functions.

It will be further observed that all of the mechanisms, specifically the motor 45, coupling device 47 and driven disc member 48 are located entirely within the protective hollow rotary drum 38. Thus the drive and transmission elements are protected not only from damage by flails 55, but also from all of the debris encountered by the flails 55. The only parts of the drive and transmission elements exterior of the drum 38 is the extension of the hollow shaft 43 and fluid lines 50 which lead to the pump 18.

It will also be observed that all of the power elements are hydraulically driven from a single source, namely, pump 18. The hydraulic motor 45 drives the flail drum 38. The yoke frame 22 is raised and lowered by hydraulic cylinders 36. The mobile frame 11 is driven by wheel motors 15 and 16 and steered by the hydraulic steering mechanism 17.

What is claimed is:

1. A land clearing machine comprising:
   a. an elongated mobile frame having a front end and a rear end,
   b. ground engaging endless traction members mounted on each side of said mobile frame,
   c. drive means on said mobile frame for driving said traction members,
   d. a yoke frame having forwardly projecting, spaced end members,
   e. means mounting said yoke frame on the front end of said mobile frame for vertically adjustable movement relative to said mobile frame, said end members being spaced transversely of said mobile frame,
   f. hydraulic means on said mobile frame for raising and lowering said yoke frame,
   g. an elongated drum,
   h. a plurality of flails, one end of each flail being fixed to the exterior surface of said drum at a predetermined location for rotation with said drum,
   i. journal means supporting the opposite ends of said drum on the respective end members for rotary movement about an axis transverse to, and in front of, said mobile frame,
   j. a hydraulic motor,
   k. means mounting said hydraulic motor within said drum and fixed relative to one of said end members,
   l. drive coupling means within said drum connecting said motor to said drum,
   m. a hydraulic pump on said frame,
   n. a hydraulic fluid circuit connecting said pump to said motor through said journal means for driving said motor.

2. The invention according to claim 1 further comprising a hollow shaft fixed to one of said end members and projecting coaxially within the corresponding end of said drum, said journal means comprising bearing means on said one end of said drum journaled about said shaft, said fluid circuit extending through said hollow shaft.

3. The invention according to claim 1 in which said drive coupling means comprises a driven member fixed to the interior of said drum, a drive shaft driven by said hydraulic motor, and a connector coupling said drive shaft to said driven member.

4. The invention according to claim 1 in which said yoke frame comprises an elongated back member extending transversely of said mobile frame, said yoke frame mounting means comprising a pair of lower arms fixed to said back member and projecting rearward, pin means connecting said lower arms to the front of said mobile frame for pivotal movement about a transverse axis, upper pin means fixed to said back member above said lower arms, upper link means comprising a knee joint pivotally connecting said mobile frame to said upper pin means, said means for raising and lowering said yoke frame comprising a linear hydraulic motor connecting the mobile frame to said knee joint, and means for supplying hydraulic fluid from said pump to said linear motor.

5. The invention according to claim 1 in which the transverse distance between the end members of said yoke frame is greater than the transverse spacing between said traction members.

6. The invention according to claim 1 further comprising a hydraulic traction motor operatively connected to each traction member for driving said traction member, and means for supplying hydraulic fluid from said pump to each of said traction motors.

* * * * *